(12) United States Patent
Chou

(10) Patent No.: US 11,820,277 B2
(45) Date of Patent: Nov. 21, 2023

(54) CARGO STRAP TENSIONER

(71) Applicant: Yeh-Chien Chou, Taoyuan (TW)

(72) Inventor: Yeh-Chien Chou, Taoyuan (TW)

(73) Assignee: STRONG YUN INDUSTRIAL CO., LTD., Taoyuan (TW)

( * ) Notice: Subject to any disclaimer, the term of this patent is extended or adjusted under 35 U.S.C. 154(b) by 148 days.

(21) Appl. No.: 17/105,387

(22) Filed: Nov. 25, 2020

(65) Prior Publication Data
US 2022/0161708 A1 May 26, 2022

(51) Int. Cl.
*B60P 7/08* (2006.01)

(52) U.S. Cl.
CPC .................. *B60P 7/0846* (2013.01)

(58) Field of Classification Search
CPC .................................. B60P 7/0846
See application file for complete search history.

(56) References Cited

U.S. PATENT DOCUMENTS

| | | | | |
|---|---|---|---|---|
| 9,061,622 B2* | 6/2015 | Knox | ...................... | B60P 7/083 |
| 9,469,239 B2* | 10/2016 | Armour | ................... | B25B 25/00 |
| 9,788,613 B2* | 10/2017 | Steffenhagen | ........ | B60P 7/0823 |
| 10,343,588 B2* | 7/2019 | Steffenhagen | ........ | B60P 7/0823 |
| 2012/0227223 A1* | 9/2012 | Knox | ...................... | B60P 7/083 24/68 CD |
| 2014/0061556 A1* | 3/2014 | Knox | ...................... | B60P 7/083 254/220 |
| 2018/0290582 A1* | 10/2018 | Chou | .................... | B60P 7/0853 |

\* cited by examiner

*Primary Examiner* — David M Upchurch
(74) *Attorney, Agent, or Firm* — Chun-Ming Shih; LANWAY IPR SERVICES

(57) ABSTRACT

A strap tensioner includes a frame, a bridge bar, a stopper, a winding shaft, a gear assembly, a crank and an observation hole. The frame has two sidewalls. The bridge bar is fixed between the two sidewalls. The stopper is of an L-shape and extends from one of the sidewalls. The gear assembly is mounted on the other sidewall and has a worm and a worm gear. The worm gear is axially connected to the winding shaft. The worm is provided with a drive shaft. The crank includes a stem connected to the drive shaft, an arm pivotedly connected to the stem and being capable of being either expanded along the stem or folded over the stem, and a handle on the arm. The observation hole is formed in the sidewall. The handle is blocked by the stopper when the arm is folded over the stem.

4 Claims, 6 Drawing Sheets

US 11,820,277 B2

CARGO STRAP TENSIONER

TECHNICAL FIELD

The invention relates to tensioners for straps used to secure cargo in trucks, particularly to cargo strap tensioners with a worm.

RELATED ART

To prevent shifting of cargo in a truck, straps are used across the cargo and tensioned. There are two primary types of strap tensioners, the one is the ratchet type, and the other one is the worm type. The worm type of strap tensioner can tension a strap by means of continuous rotation of a worm shaft driven by a user's labor or an electric motor.

The worm type of strap tensioner is primarily composed of a U-shaped frame and a gear assembly mounted on a side of the U-shaped frame. The U-shaped frame is formed by a metallic plate and has two sidewalls and a bottom therebetween. No support is disposed between the top (open end) of U-shaped frame, so the top (open end) of the U-shaped frame is a weak point which is easy to be deformed by collision.

In the U-shaped frame, a winding shaft is rotatably disposed between the two sidewalls for detachably connecting an end of a strap and winding the strap. However, the wound strap around the winding shaft cannot be observed or detected through the sidewalls. The strap around the winding shaft may not be solidly wound on the winding shaft to make gaps remain between strap layers. This will cause false fastening to the cargo.

In the manual worm type of the strap tensioner, such as U.S. Pat. No. 9,061,622, a crank 526 is connected to a worm shaft 96 for rotating the worm 106' and a stopper 500 for restraining a foldable handle 548 of the crank 526. The crank 526 is unfoldable, so its effective length is unvarying. The effective length means a force arm. In other words, its effective length cannot be lengthened, so it needs much labor to rotate the crank.

Moreover, the stopper 500 is a metallic plate 590, 588 with a slot 589 and the metallic plate is perpendicularly extended from the sidewall 516. The metallic plate is easy to be deformed by collision. Also, when the handle 548 is folded, it must be embedded into the slot 589 for restraint. However, a locking bar 560 of the handle 548 can be embedded into the slot 589 if and only if the locking bar 560 is aligned with the slot 589. However, the locking bar 560 is too small, so it is easy to be deformed by collision. Once the locking bar 560 is deformed, it will not be able to be embedded into the slot 589. Thus, this is a problem in practice.

SUMMARY OF THE INVENTION

An object of the invention is to provide a cargo strap tensioner, which reinforces strength of the U-shaped frame, provides an observation hole on a sidewall for monitoring the wound strap, provides a foldable crank whose effective length can be lengthened to save labor, and a stopper without a slot for easily restraining the handle.

To accomplish the above object, the cargo strap tensioner of the invention includes:
  a U-shaped frame, having a first sidewall, a second sidewall and a bottom plate connected between the first and second sidewalls;
  a bridge bar, fixed at a top portion of the U-shaped frame between the first and second sidewalls;
  a stopper, being of an L-shape, extending from the first sidewall;
  a winding shaft, rotatably disposed between the first and second sidewalls;
  a gear assembly, mounted on the first sidewall, having a worm and a worm gear engaging with the worm, the worm gear being axially connected to the winding shaft, and the worm being provided with a drive shaft;
  a crank comprising:
    a stem, connected to the drive shaft;
    an arm, pivotedly connected to the stem, and being capable of being either expanded along the stem or folded over the stem; and
    a handle, perpendicularly fixed on the arm; and
  an observation hole, formed in the second sidewall, and adjacent to the winding shaft;
  wherein the handle is blocked by the stopper when the arm is folded over the stem.

To accomplish the above object, the cargo strap tensioner of the invention includes:
  a U-shaped frame, having a first sidewall, a second sidewall and a bottom plate connected between the first and second sidewalls;
  a bridge bar, fixed at a top portion of the U-shaped frame between the first and second sidewalls;
  a winding shaft, rotatably disposed between the first and second sidewalls;
  a gear assembly, mounted on the first sidewall, having a worm and a worm gear engaging with the worm, the worm gear being axially connected to the winding shaft, the worm being provided with a drive shaft, and a nut being fixed on a top end of the drive shaft for being rotated by an electric wrench or a manual wrench; and
  an observation hole, formed in the second sidewall, and adjacent to the winding shaft.

DETAILED DESCRIPTION OF THE INVENTION

Figure 1:
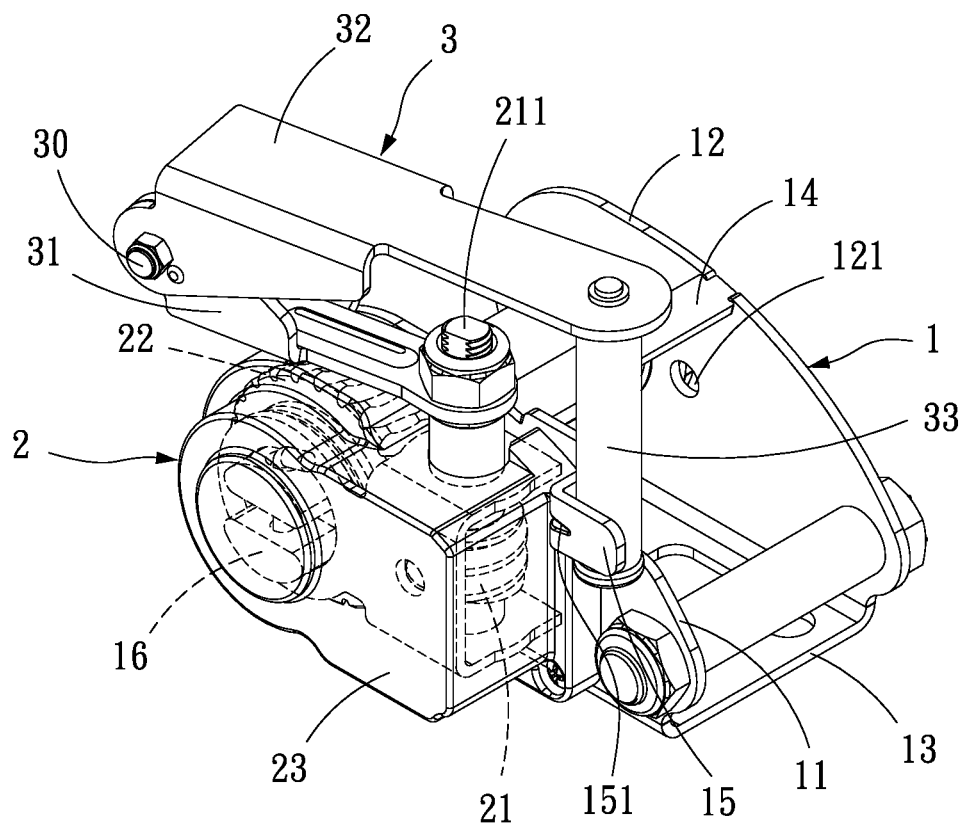
FIG. 1 is a schematic view of a cargo strap tensioner of the invention.
Figure 2:
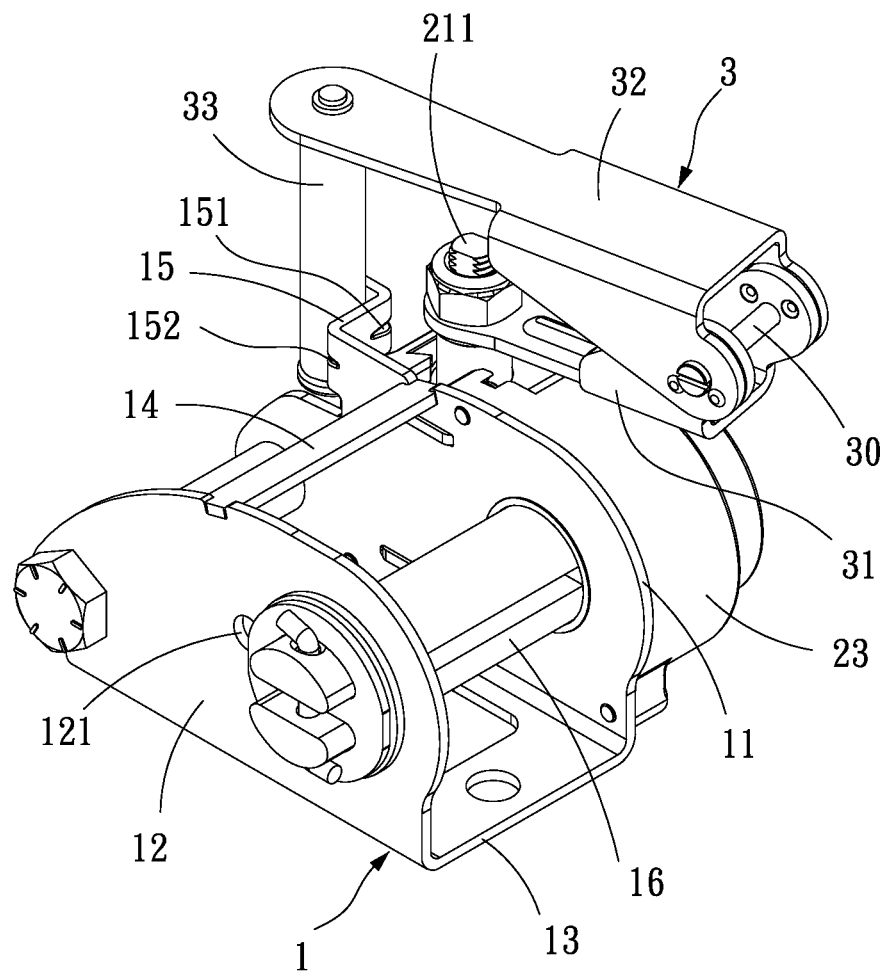
FIG. 2 is an assembled view of the cargo strap tensioner of the invention.
Figure 3:
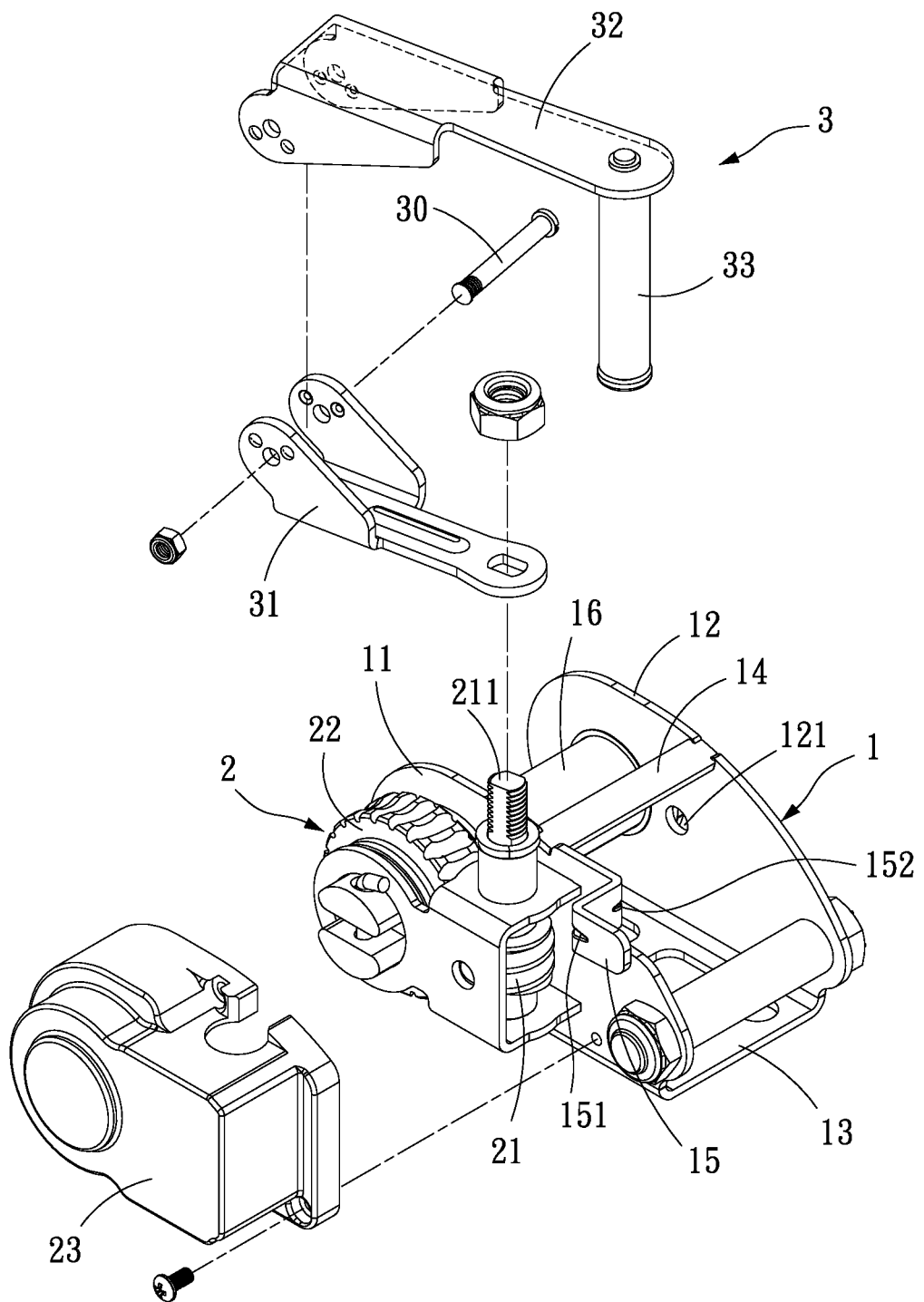
FIG. 3 is an exploded view of the cargo strap tensioner of the invention.

Please refer to FIGS. 1-3, which shows a manual cargo strap tensioner of the invention. The manual cargo strap tensioner primarily includes a U-shaped frame 1, a gear assembly 2 and a crank 3.

The U-shaped frame 1 is composed of a first sidewall 11, a second sidewall 12 and a bottom plate 13 connected between the first and second sidewalls 11, 12. A bridge bar 14 is fixed at a top portion of the U-shaped frame 1 between the first and second sidewalls 11, 12. The first and second sidewalls 11, 12 are supported by the bridge bar 14 to enhance strength of the U-shaped frame 1. A stopper 15 which is of an L-shape extends from the first sidewall 11. Each of corners of the stopper 15 is provided with a rib 151, 152 for reinforcement.

A winding shaft 16 is rotatably disposed between the first and second sidewalls 11, 12. The winding shaft 16 is used for detachably connecting an end of a strap (not shown). A gear assembly 2 is mounted on the first sidewall 11 and has a worm 21, a worm gear 22 engaging with the worm 21 and a cover 23. The worm gear 22 is axially connected to the winding shaft 16. The worm 21 is provided with a drive shaft 211. When the drive shaft 211 is rotated, the worm 21 is synchronously rotated and both the worm gear 22 and the winding shaft 16 are driven to rotate so as to wind the strap on the winding shaft 16.

An end of the drive shaft 211 is connected with the crank 3 for rotating the worm 21. The crank 3 includes a stem 31, an arm 32 and a handle 33. An end of the stem 31 is connected to the drive shaft 211. An end of the arm 32 is pivotedly connected to the stem 31 to make the arm 32 foldable. The arm 32 is capable of being either expanded along the stem 31 or folded over the stem 31. Preferably, the arm 32 is connected to the stem 31 by a pivot 30. The handle 33 is perpendicularly fixed on an outer end of the arm 32 for being held by a user.

An observation hole 121 is formed in the second sidewall 12. The observation hole 121 is adjacent to the winding shaft 16 for allowing a user to monitor the strap wound on the winding shaft 16 through the second sidewall 12.

Figure 4:
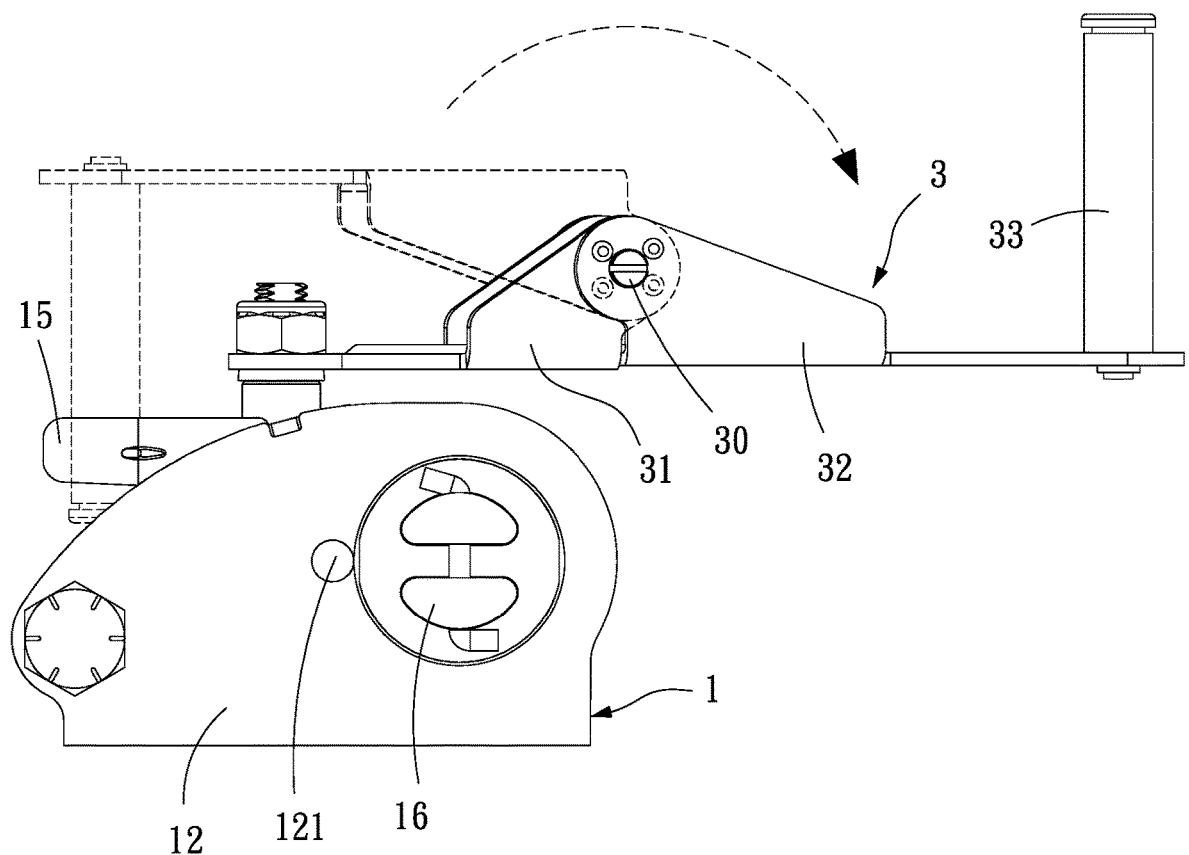
FIG. 4 is a schematic view of the cargo strap tensioner of the invention, which shows stretch and fold of the crank.
Figure 5:
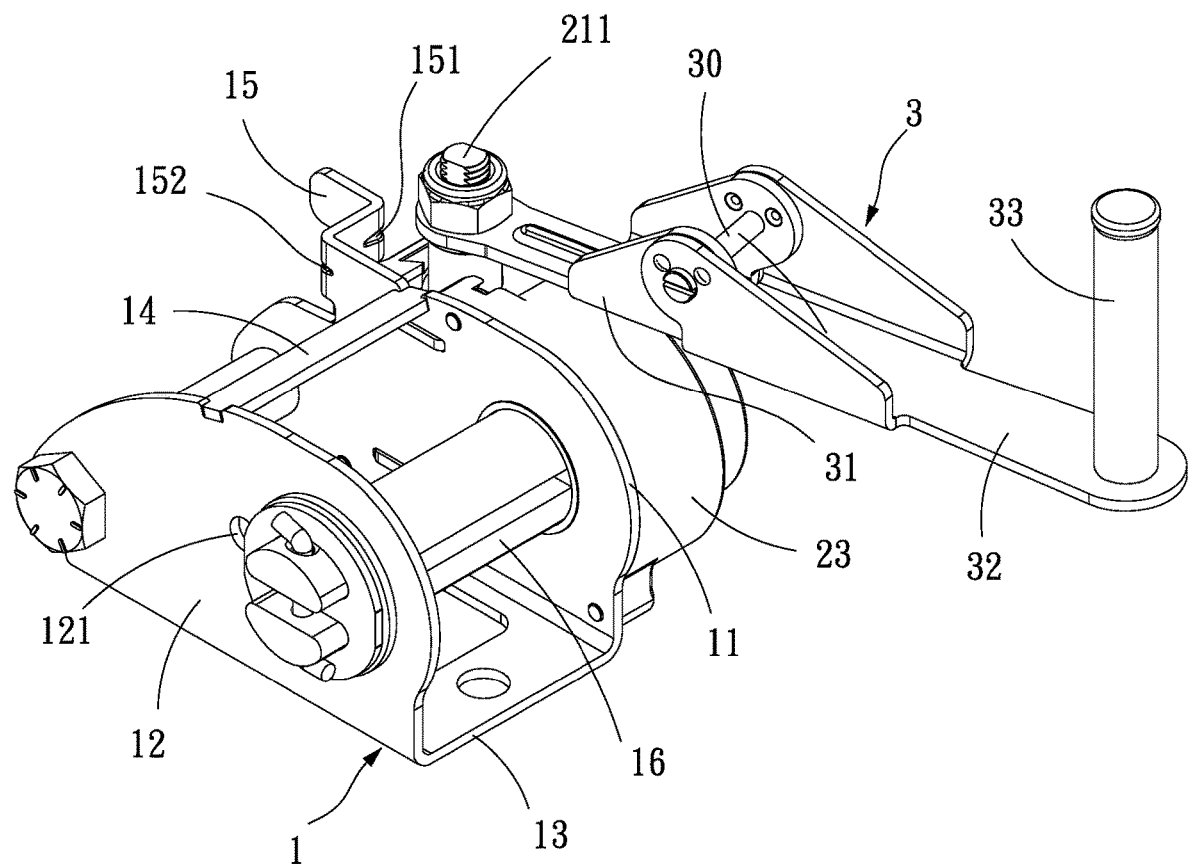
FIG. 5 is a schematic side view of the cargo strap tensioner of the stretched crank of the invention.

Please refer to FIGS. 4 and 5. When the arm 32 is stretched out to align with the stem 31, the overall length of the crank 3 is approximately equal to the sum of lengths of the stem 31 and the arm 32. The handle 33 is blocked by the stopper 15 when the arm 32 is folded over the stem 31 as shown in FIG. 2. Because the stopper 15 is L-shaped, it is unnecessary that the handle 33 locates at an accurate position. Also, the ribs 151, 152 can prevent the stopper 15 from being deformed by collision.

Figure 6:
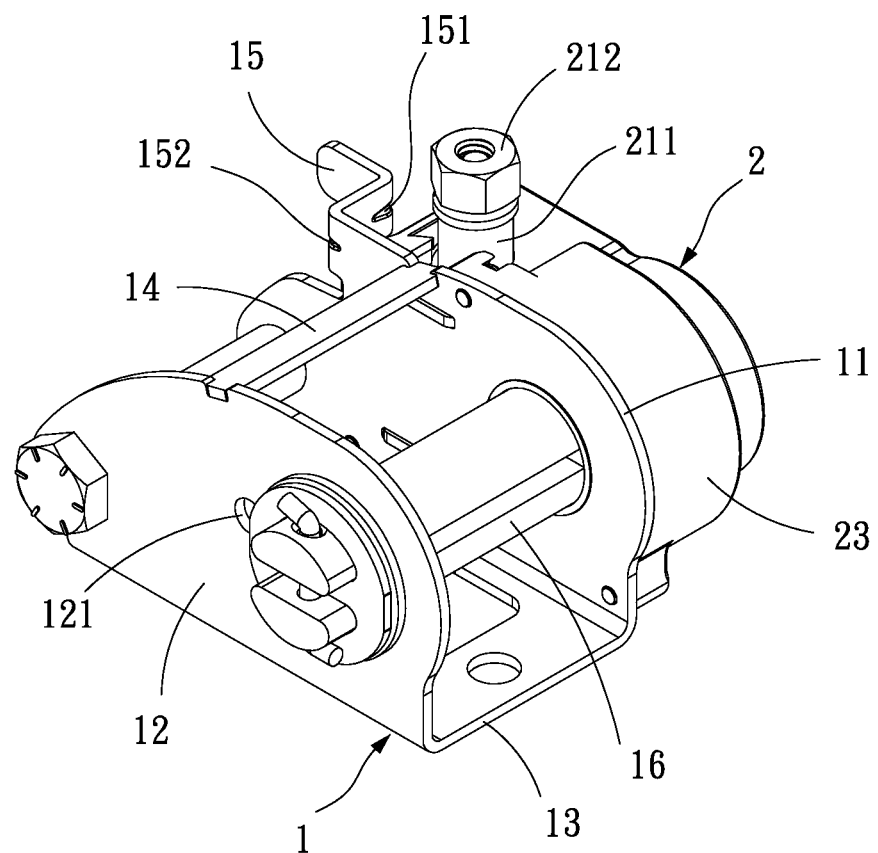
FIG. 6 is a schematic view of another embodiment of the cargo strap tensioner of the invention.

FIG. 6 shows another embodiment of the cargo strap tensioner of the invention. This cargo strap tensioner has no the crank 3 but is provided with a nut 212 fixed on the top end of the drive shaft 211. The nut 212 associated with the drive shaft 211 can be rotated by an electric wrench or a manual wrench to replace the crank 3.

It will be appreciated by persons skilled in the art that the above embodiments have been described by way of example only and not in any limitative sense, and that various alterations and modifications are possible without departure from the scope of the invention as defined by the appended claims.

What is claimed is:

1. A cargo strap tensioner comprising:
   a U-shaped frame, having a first sidewall, a second sidewall and a bottom plate connected between the first and second sidewalls;
   a bridge bar, fixed at a top portion of the U-shaped frame between the first and second sidewalls;
   a stopper, being of an L-shape, extending from the first sidewall;
   a winding shaft, rotatably disposed between the first and second sidewalls;
   a gear assembly, mounted on the first sidewall, having a worm and a worm gear engaging with the worm, the worm gear being axially connected to the winding shaft, and the worm being located aside the worm gear along a lengthwise direction of the first sidewall and provided with a drive shaft;
   a crank located at the first sidewall, comprising:
      a stem, connected to the drive shaft;
      an arm, with one end pivotedly connected to the stem, and being capable of folding on or unfolding over to extend along with the stem; and
      a handle, perpendicularly fixedly secured on the arm; and
   an observation hole, formed in the second sidewall, and adjacent to the winding shaft;
   wherein the handle is blocked by the stopper when the arm folds on the stem to rotate the handle from a first position to a second position in an approximate 180 degrees.

2. The cargo strap tensioner of claim 1, wherein a corner of the stopper is provided with a rib.

3. The cargo strap tensioner of claim 1, wherein the arm is connected to the stem by a pivot.

4. The cargo strap tensioner of claim 1, wherein the gear assembly further comprises a cover.

* * * * *